US008795907B2

(12) United States Patent
Becker et al.

(10) Patent No.: US 8,795,907 B2
(45) Date of Patent: Aug. 5, 2014

(54) COMPRESSOR SYSTEM WITH A FREEWHEELING EXPANDER

(75) Inventors: Marc Becker, Idstein (DE); Remy Fontaine, Wiesbaden (DE); Thomas W. Tighe, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1204 days.

(21) Appl. No.: 12/708,935

(22) Filed: Feb. 19, 2010

(65) Prior Publication Data

US 2011/0207023 A1    Aug. 25, 2011

(51) Int. Cl.
| | |
|---|---|
| *H01M 8/06* | (2006.01) |
| *H01M 8/04* | (2006.01) |
| *H01M 2/38* | (2006.01) |
| *H01M 2/40* | (2006.01) |
| *H01M 8/24* | (2006.01) |

(52) U.S. Cl.
USPC ............ 429/408; 429/413; 429/434; 429/456

(58) Field of Classification Search
USPC ............ 429/408, 413, 456, 517, 434; 60/517
See application file for complete search history.

(56) References Cited

U.S. PATENT DOCUMENTS

| | | | | |
|---|---|---|---|---|
| 6,589,033 | B1 * | 7/2003 | Johnson et al. | 418/13 |
| 6,653,004 | B1 * | 11/2003 | Barber | 429/430 |
| 7,442,457 | B2 * | 10/2008 | Pechtold | 429/413 |
| 8,015,808 | B2 * | 9/2011 | Keefer et al. | 60/517 |

* cited by examiner

*Primary Examiner* — Patrick Ryan
*Assistant Examiner* — Julian Anthony
(74) *Attorney, Agent, or Firm* — Fraser Clemens Martin & Miller LLC; J. Douglas Miller

(57) ABSTRACT

A fuel cell system is disclosed that employs an expander for recovering mechanical energy from a cathode exhaust fluid produced by the fuel cell system to generate torque. The expander is coupled to a shaft of a compressor with a freewheel mechanism, wherein the freewheel mechanism transfers the torque from the expander to the compressor when a rate of rotation of a driveshaft of the expander is greater than the rate of rotation of the shaft of the compressor, and selectively militates against the expander acting as a restrictor to the shaft of the compressor when a rate of rotation of the driveshaft of the expander is substantially equal to or less than a rate of rotation of the shaft of the compressor.

20 Claims, 2 Drawing Sheets

COMPRESSOR SYSTEM WITH A FREEWHEELING EXPANDER

FIELD OF THE INVENTION

This invention relates to a fuel cell system and, more particularly, to a fuel cell system including a compressor coupled to a freewheeling expander.

BACKGROUND OF THE INVENTION

Hydrogen is a clean fuel and can be used to efficiently produce electricity in a fuel cell system. A hydrogen fuel cell is an electro-chemical device that includes an anode and a cathode with an electrolyte membrane disposed therebetween. The anode receives a reactant, (e.g. hydrogen gas), and the cathode receives an oxidant (e.g. oxygen or air). The hydrogen gas is disassociated in the anode to generate free hydrogen protons and electrons. The hydrogen protons pass through the electrolyte membrane to the cathode. The hydrogen protons react with the oxygen and the electrons in the cathode to generate water. The electrons from the anode cannot pass through the electrolyte membrane, and thus, are directed through other fuel cell system components before being sent to the cathode. Typically, numerous fuel cells are combined in a fuel cell stack to serve as an energy source and generate a desired power for a system such as a vehicle. Not all of the oxygen is consumed by the fuel cell stack, and some of the oxygen is output as a cathode exhaust fluid that may include water as a fuel cell stack by-product.

The oxygen is supplied to the fuel cell system by a compressor. The compressor is typically powered by a motor which uses a portion of the energy generated by the fuel cell system. Accordingly, an efficiency of the fuel cell system is not optimized.

It would be desirable to produce a fuel cell system including a compressor coupled to a freewheeling expander, wherein the expander assists a motor to power the compressor and optimize an efficiency of the fuel cell system.

An advantage of the freewheeling expander is that the expander can assist the compressor over broad flow and pressure ranges without requiring additional components such as actuators (e.g. wastegate valve, variable turbine geometry), for example. The freewheeling expander is a simple, cost effective, self-regulating means to improve an efficiency of the fuel cell system.

SUMMARY OF THE INVENTION

In accordance and agreement with the present invention, a fuel cell system including a compressor coupled to a freewheeling expander, wherein the expander assists a motor to power the compressor and optimize an efficiency of the fuel cell system, has surprisingly been discovered.

In one embodiment, the fuel cell system comprises: a fuel cell stack including a cathode having an inlet and an outlet, wherein a first fluid flows through the inlet of the cathode and a second fluid flows through the outlet of the cathode; a compressor for compressing the first fluid, an inlet of the compressor in fluid communication with a source of the first fluid and an outlet of the compressor in fluid communication with the inlet of the cathode; an expander coupled to the compressor, wherein the expander is in fluid communication with the outlet of the cathode to recover mechanical energy from the second fluid and generate torque to power the compressor; and a freewheel mechanism coupled to the compressor and the expander for transferring the torque from the expander to the compressor, wherein the freewheel mechanism militates against the expander acting as a restrictor to the compressor.

In another embodiment, the fuel cell system comprises: a fuel cell stack including a cathode having an inlet and an outlet, wherein a first fluid flows through the inlet of the cathode and a second fluid flows through the outlet of the cathode; a compressor for compressing the first fluid, the compressor including a shaft, an inlet, and an outlet, wherein the inlet of the compressor is in fluid communication with a source of the first fluid and the outlet of the compressor is in fluid communication with the inlet of the cathode; an expander coupled to the shaft of the compressor, wherein the expander is in fluid communication with the outlet of the cathode to recover mechanical energy from the second fluid and generate torque to power the compressor; and a freewheel mechanism including a driving race, a driven race disposed in the driving race, and at least one torque transfer element disposed therebetween, the driving race coupled to a shaft of the expander and the driven race coupled to the shaft of the compressor for transferring the torque from the expander to the compressor, wherein the torque transfer element militates against the expander acting as a restrictor to the compressor.

In another embodiment, the method of operating a fuel cell system comprises the steps of: providing a fuel cell stack including a cathode having an inlet and an outlet, wherein a first fluid flows through the inlet of the cathode and a second fluid flows through the outlet of the cathode; providing a compressor for compressing the first fluid, an inlet of the compressor in fluid communication with a source of the first fluid and an outlet of the compressor in fluid communication with the inlet of the cathode; providing an expander coupled to the compressor, wherein the expander is in fluid communication with the outlet of the cathode; providing a freewheel mechanism for transferring the torque from the expander to the compressor, wherein the freewheel mechanism militates against the expander acting as a restrictor to the compressor; and causing the second fluid to flow through the expander to recover mechanical energy therefrom and generate torque to power to the compressor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate an exemplary embodiment of the invention. The description and drawings serve to enable one skilled in the art to make and use the invention, and are not intended to limit the scope of the invention in any manner. In respect of the method disclosed, the steps presented are exemplary in nature, and thus, the order of the steps is not necessary or critical.

Figure 1:
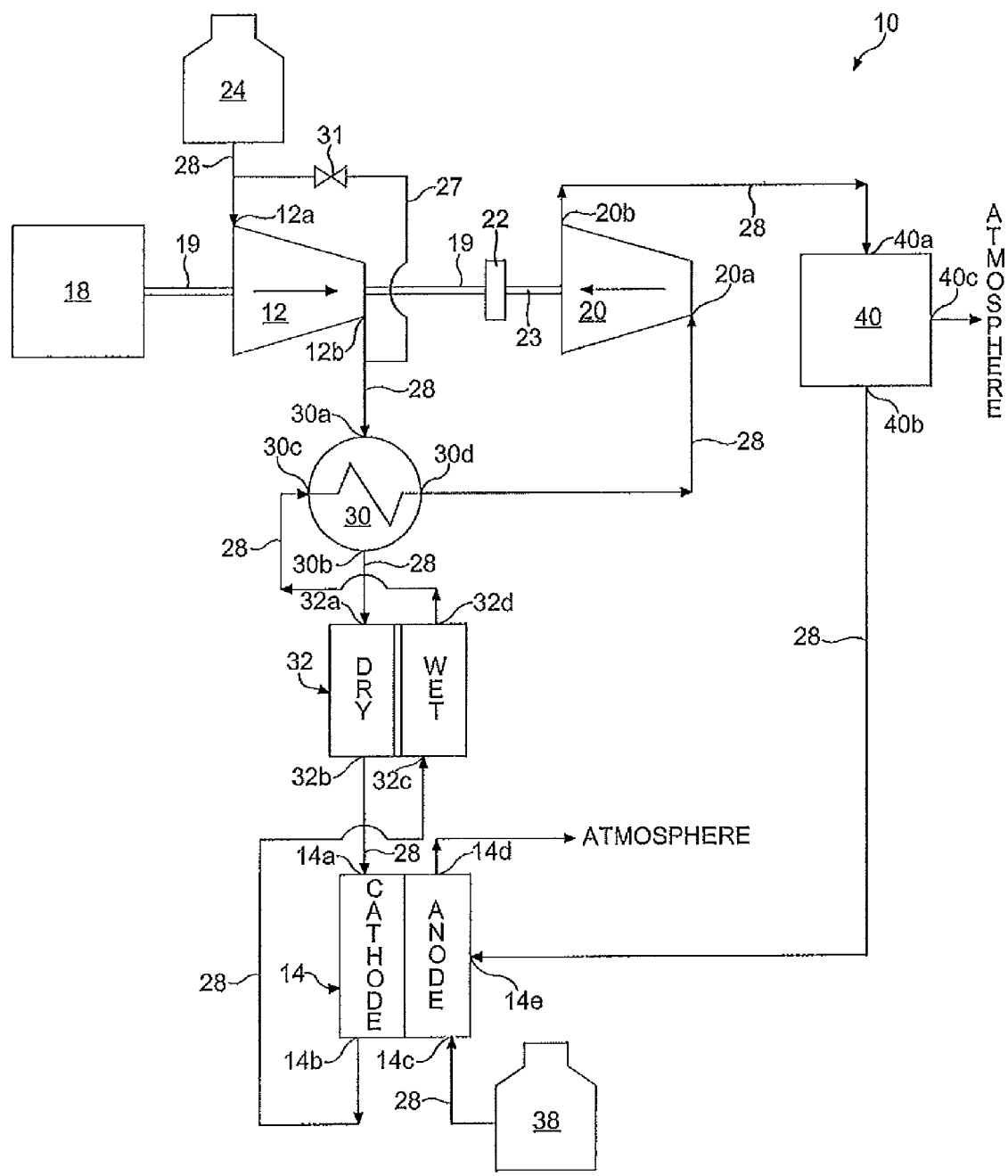
FIG. 1 is a schematic flow diagram of a fuel cell system according to an embodiment of the invention.

FIG. 1 shows a fuel cell system 10 according to an embodiment of the invention. The fuel cell system 10 includes a compressor 12 in fluid communication with a fuel cell stack

14. In the embodiment shown, the compressor 12 is a motorized compressor. It is understood that the compressor 12 can be any device for compressing a fluid as desired such as a centrifugal air compressor, a turbo-machine, a centrifugal compressor, a mixed flow compressor, a blower, and a fan, for example. A motor 18 and a freewheeling expander 20 are coupled to a rotatable shaft 19 of the compressor 12. The motor 18 and the expander 20 urge the shaft 19 in a first direction to power the compressor 12. It is understood that the motor 18 can be any conventional motor as desired such as an electric motor, for example.

The expander 20 is coupled to the shaft 19 with a freewheel mechanism or overrunning clutch 22. It is understood that the freewheel mechanism 22 can be any freewheel mechanism as desired. It is further understood that the motor 18 can also be coupled to the shaft 19 with a freewheel mechanism or overrunning clutch (not shown), if desired. The freewheel mechanism 22 permits a shaft 23 the expander 20 to independently rotate when a rate of rotation thereof is substantially equal to or less than a rate of rotation of the shaft 19 of the compressor 12. Accordingly, the freewheel mechanism 22 selectively militates against the expander 20 acting as a restrictor to the shaft 19, and limit an efficiency of the compressor 12. When the rate of rotation of the shaft 23 of the expander 20 is greater than the rate of rotation of the shaft 19 of the compressor 12, the freewheel mechanism 22 permits the expander 20 to selectively urge the shaft 19 in the first direction. Accordingly, the expander 20 adds power to the shaft 19 and reduces a demand on the motor 18 to supply power to the compressor 12.

Figure 2:
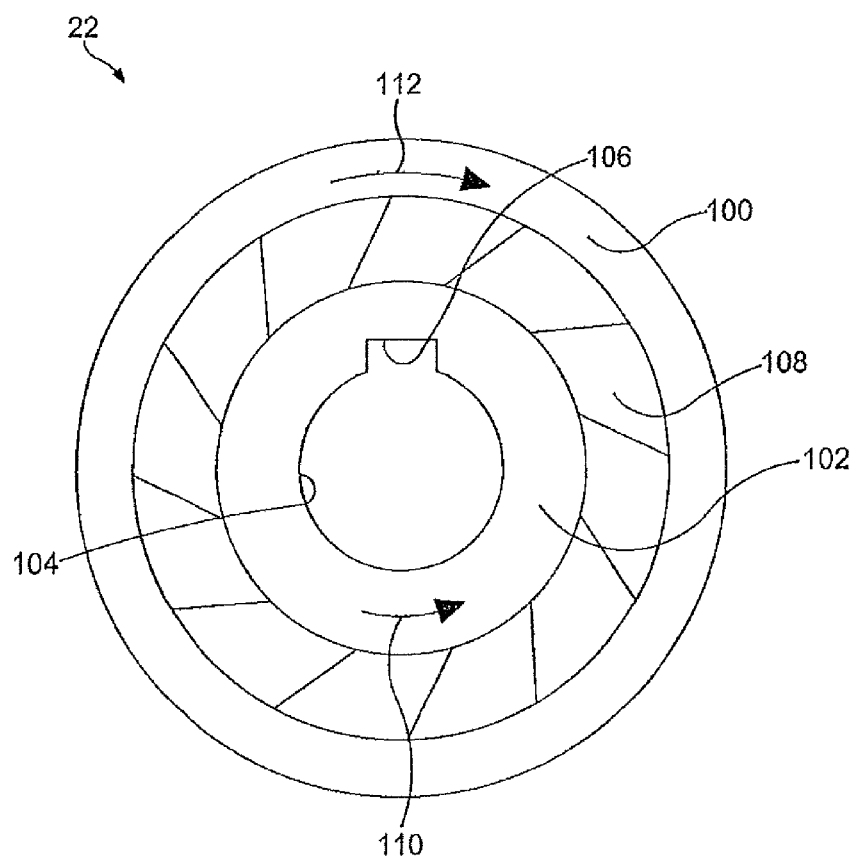
FIG. 2 is a schematic view of a freewheel mechanism of the fuel cell system illustrated in FIG. 1.

As shown in FIG. 2, the freewheel mechanism 22 includes a driving race 100 having a substantially cylindrical shape. It is understood that the driving race 100 can have any shape and size as desired. The driving race 100 is coupled to the shaft 23 of the expander 20. It is understood that the driving race 100 can be coupled to the expander 20 by any method as desired. The freewheel mechanism 22 further includes a driven race 102 concentric with and disposed in the driving race 100. The driven race 102 has a substantially cylindrical shape, although it is understood that the driven race 102 can have any shape and size, as desired. The driven race 102 includes a central aperture 104 formed therein to receive the shaft 19 of the compressor 12. A surface of the aperture 104 may include at least one indentation 106 formed therein. The shaft 19 is typically secured in the driven race by a locking mechanism (not shown) such as an array of splines or teeth, a key bar, and the like, for example, that cooperates with the at least one indentation 106 formed in the surface of the aperture 104.

An array of torque transfer elements 108 is disposed between the driving race 100 and the driven race 102. Each of the torque transfer elements 108 includes a locking portion (not shown) provided with a profile. When a rate of rotation of the driven race 102 in the first direction indicated by an arrow 110 is less than a rate of rotation in a second direction indicated by a second arrow 112 of the driving race 100, the locking portion wedges between the driving race 100 and the driven race 102, allowing torque transfer from the driving race 100 to the driven race 102. The locking portion of the torque transfer elements 108 engages by any method as desired such as applying a force at a center of gravity of the locking portion, employing an urging mechanism (e.g. a spring), and the like, for example. However, the locking portion of the torque transfer elements 108 do not engage, and therefore, do not transfer torque from the driven race 102 to the driving race 100 when the rate of rotation of the driving race 100 is substantially equal to or less than the rate of rotation of the driven race 102. Accordingly, the driven race 102 of the freewheel mechanism 22 overruns, and militates against backdriving of the shaft 23 of the expander 20. The freewheel mechanism 22 allows for powering the compressor 12 by either the motor 20, the expander 20, or both with no further modification of the fuel cell system 10 and without employing additional controls.

An inlet 12a of the compressor 12 is in fluid communication with an oxidant source 24 for storing an oxidant through a conduit 28. The oxidant source 24 is typically a source of air such as a tank or the atmosphere, for example. An outlet 12b of the compressor 12 is in fluid communication with a valve 31. As shown, the valve 31 is disposed in a recirculation conduit 27 of the compressor 12. However, other configurations can be used. The valve 31 controls a flow of the oxidant to the fuel cell stack 14 and militates against a surging of the compressor 12. In an open position, the valve 31 reduces the flow of the oxidant to the fuel cell stack 14 and increases the flow of the oxidant from the compressor 12. For example, the valve 31 is in the open position at a low power operating state of the fuel cell system 10 (i.e. when a volume of the oxidant desired by the fuel cell stack 14 is lower than a minimum volume of oxidant produced by the compressor 12). In another example, the valve 31 is in the open position at a transition from a high power operating state of the fuel cell stack 14 to the low power operating state of the fuel cell stack 14 (i.e. when the volume of the oxidant desired by the fuel cell stack 14 is quickly reduced). In yet another example, the valve 31 is in the open position when a pressure to flow ratio of the oxidant desired by the fuel cell stack 14 is greater than a pressure to flow ratio which can be produced by the compressor 12.

The outlet 12b of the compressor 12 is also in fluid communication with a first inlet 30a of a heat exchanger 30 through the conduit 28. The heat exchanger 30 heats the oxidant at start-up and during the low power operating state of the fuel cell stack 14, and cools the oxidant at the medium and high power operating states thereof. It is understood that any conventional heat exchanger can be employed as desired such as a shell and tube heat exchanger, a plate heat exchanger, an air-cooled heat exchanger, and the like, for example. In addition to the first inlet 30a, the heat exchanger 30 includes a first outlet 30b, a second inlet 30c, and a second outlet 30d. The second outlet 30d is in fluid communication with an inlet 20a of the expander 20 through the conduit 28. The first outlet 30b of the heat exchanger 30 is in fluid communication with a first inlet 32a of a humidifier 32 through the conduit 28.

In the embodiment shown, the humidifier 32 is a water vapor transfer unit adapted to humidify the oxidant prior to the oxidant entering into the fuel cell stack 14. It is understood that the humidifier 32 can be any humidifier as desired. The humidifier 32 includes a dry side and a wet side separated by a water vapor permeable membrane. The dry side includes the first inlet 32a and a first outlet 32b, and the wet side includes a second inlet 32c, and a second outlet 32d. The second outlet 32d of the humidifier 32 is in fluid communication with the second inlet 30c of the heat exchanger 30 through the conduit 28. The first outlet 32b is in fluid communication with a first inlet 14a of the fuel cell stack 14 through the conduit 28.

The fuel cell stack 14 typically includes a stack of cathodes, anodes, and membranes (fuel cells), as discussed hereinabove. It is understood that the number of fuel cells in the fuel cell stack 14 may vary. Each fuel cell of the fuel cell stack 14 has a pair of MEAs (not shown) separated by an electrically conductive bipolar plate (not shown). The MEAs and bipolar plates are stacked together between clamping plates or end plates (not shown) and end contact elements (not shown).

The fuel cell stack 14 further includes a first outlet 14b, a second inlet 14c, and a second outlet 14d. It is understood that the number of inlets and outlets in the fuel cell stack 14 may vary based on the size of the stack in use, an amount of outlet energy required from the stack 14, and other design considerations, for example. The first outlet 14b is in fluid communication with the second inlet 32c of the humidifier 32 through the conduit 28. It is understood that the first outlet 14b may be in fluid communication with the atmosphere, another fuel cell stack (not shown), or other system component, as desired. The second inlet 14c is in fluid communication with a fuel source 38 for storing a fuel through the conduit 28. The fuel source 38 is typically a source of hydrogen gas such as a fuel tank, for example. The second outlet 14d is in fluid communication with the atmosphere. It is understood that the second outlet 14d may be in fluid communication with an exhaust system or other system component, as desired.

As shown, the fuel cell stack 14 includes a third inlet 14e in fluid communication with a first outlet 40b of the fluid recovery system 40. An inlet 40a of the fluid recovery system 40 is in fluid communication with an outlet 20b of the expander 20 through the conduit 28. The fluid recovery system 40 is adapted to recover water from a cathode exhaust fluid. The fluid recovery system 40 typically includes a condenser (not shown), a fluid reservoir (not shown), and a pump (not shown). A second outlet 40c of the fluid recovery system 40 is in fluid communication with the atmosphere. It is understood that the fluid recovery system 40 can include other system components, as desired.

In use, the oxidant is caused to flow from the oxidant source 24 through the conduit 28 to the inlet 12a of the compressor 12. In the compressor 12, the volume of the oxidant is reduced, thereby increasing the pressure and the temperature thereof. The oxidant is then caused to flow from the outlet 12b of the compressor 12 through the conduit 28 to the inlet 30a of the heat exchanger 30. In the heat exchanger 30, the oxidant is heated or cooled to a desired temperature depending on the operating state of the fuel cell stack 14. The conditioned oxidant is then caused to flow from the outlet 30b of the heat exchanger 30 through the conduit 28 to the first inlet 32a of the dry side of the humidifier 32.

In the embodiment shown, a wet fluid such as air and the cathode exhaust fluid are caused to flow through the wet side of the humidifier 32. Together, the wet fluid and the cathode exhaust fluid have a higher moisture content than the oxidant flowing through the dry side. Water vapor from the wet fluid and the cathode exhaust fluid is transferred through the membrane of the humidifier 32 to the oxidant flowing therethrough. The moist, conditioned oxidant is then caused to flow from the first outlet 32b of the humidifier 32 through the conduit 28 to the first inlet 14a of the fuel cell stack 14.

Simultaneous to the oxidant being caused to flow to the fuel cell stack 14, the fuel is caused to flow from the fuel source 38 to the second inlet 14c of the fuel cell stack 14 through the conduit 28. In the fuel cell stack 14, the moist, conditioned oxidant electrochemically reacts with the fuel to generate an electrical power output, heat, an anode exhaust fluid, the cathode exhaust fluid, and other reaction byproducts (e.g. water). The anode exhaust fluid is then vented to the atmosphere through the second outlet 14d. Optionally, the anode exhaust fluid may flow through an exhaust system before being vented to the atmosphere, if desired. The cathode exhaust fluid from the fuel cell stack 14 is caused to flow through the first outlet 14b, through the conduit 28, to the second inlet 32c of the humidifier 32.

After transferring water vapor in the humidifier 32, the cathode exhaust fluid is caused to flow through the second outlet 32d, through the conduit 28, to the second inlet 30c of the heat exchanger 30. In the heat exchanger 30, the cathode exhaust fluid receives heat energy from or provides heat energy to the oxidant in the heat exchanger 30, depending upon the operating conditions of the fuel cell system 10. The cathode exhaust fluid is then caused to flow though the second outlet 30d of the heat exchanger 30, through the conduit 28, to the inlet 20a of the expander 20. The expander 20 recovers mechanical energy from the cathode exhaust fluid and generates torque to power the shaft 19 of the compressor 12.

In the embodiment shown, the cathode exhaust fluid is then caused to flow through the outlet 20b of the expander 20, through the conduit 28, to the inlet 40a of the fluid recovery system 40. In the fluid recovery system 40, any remaining water from the cathode exhaust fluid is recovered for circulation through the fuel cell stack 14. The cathode exhaust fluid is then caused to flow through the second outlet 40c of the fluid recovery system 40, through the conduit 28, to the atmosphere. Optionally, the cathode exhaust fluid may flow through an exhaust system (not shown) before being vented to the atmosphere or to other system components, if desired. The recovered water is then caused to flow through the first outlet 40b, through the conduit 28, to the fuel cell stack.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack including a cathode having an inlet and an outlet, wherein a first fluid flows through the inlet of the cathode and a second fluid flows through the outlet of the cathode;
    a compressor for compressing the first fluid, an inlet of the compressor in fluid communication with a source of the first fluid and an outlet of the compressor in fluid communication with the inlet of the cathode;
    an expander coupled to the compressor, wherein the expander is in fluid communication with the outlet of the cathode to recover mechanical energy from the second fluid and generate torque to power the compressor; and
    an overrunning clutch coupled to the compressor and the expander for transferring the torque from the expander to the compressor, wherein the overrunning clutch militates against the expander acting as a restrictor to the compressor.

2. The fuel cell system according to claim 1, wherein the expander is coupled to a shaft of the compressor to urge the shaft of the compressor in a first direction when a rate of rotation of a shaft of the expander is greater than a rate of rotation of the shaft of the compressor.

3. The fuel cell system according to claim 1, wherein the overrunning clutch is coupled to a shaft of the expander to militate against a backdriving of the shaft of the expander when a rate of rotation of the shaft of the expander is at least one of substantially equal to and less than a rate of rotation of the shaft of the compressor.

4. The fuel cell system according to claim 1, further comprising a heat exchanger disposed between and in fluid communication with the outlet of the compressor and the inlet of the cathode of the fuel cell stack.

5. The fuel cell system according to claim 4, wherein the heat exchanger is in fluid communication with an inlet of the expander.

6. The fuel cell system according to claim 4, further comprising a humidifier disposed between and in fluid communication with an outlet of the heat exchanger and the inlet of the cathode of the fuel cell stack.

7. The fuel cell system according to claim 6, wherein the humidifier is disposed between and in fluid communication with the outlet of the cathode of the fuel cell stack and an inlet of the heat exchanger.

8. The fuel cell system according to claim 1, further comprising a motor coupled to the compressor to provide power thereto.

9. The fuel cell system according to claim 1, wherein the first fluid is an oxidant.

10. The fuel cell system according to claim 1, wherein the second fluid is a cathode exhaust fluid.

11. A fuel cell system comprising:
   a fuel cell stack including a cathode having an inlet and an outlet, wherein a first fluid flows through the inlet of the cathode and a second fluid flows through the outlet of the cathode;
   a compressor for compressing the first fluid, the compressor including a shaft, an inlet, and an outlet, wherein the inlet of the compressor is in fluid communication with a source of the first fluid and the outlet of the compressor is in fluid communication with the inlet of the cathode;
   an expander coupled to the shaft of the compressor, wherein the expander is in fluid communication with the outlet of the cathode to recover mechanical energy from the second fluid and generate torque to power the compressor; and
   a freewheel mechanism including a driving race, a driven race disposed in the driving race, and at least one torque transfer element disposed therebetween, the driving race coupled to a shaft of the expander and the driven race coupled to the shaft of the compressor for transferring the torque from the expander to the compressor, wherein the torque transfer element militates against the expander acting as a restrictor to the compressor.

12. The fuel cell system according to claim 11, wherein the expander is coupled to the shaft of the compressor to urge the shaft of the compressor in a first direction when a rate of rotation of the shaft of the expander is greater than a rate of rotation of the shaft of the compressor.

13. The fuel cell system according to claim 11, wherein the freewheel is coupled to the shaft of the expander to militate against a backdriving of the shaft of the expander when a rate of rotation of the shaft of the expander is at least one of substantially equal to and less than a rate of rotation of the shaft of the compressor.

14. The fuel cell system according to claim 11, further comprising a heat exchanger disposed between and in fluid communication with the outlet of the compressor and the inlet of the cathode of the fuel cell stack, wherein the heat exchanger is also in fluid communication with an inlet of the expander.

15. The fuel cell system according to claim 14, further comprising a humidifier disposed between and in fluid communication with an outlet of the heat exchanger and the inlet of the cathode of the fuel cell stack, wherein the humidifier is also in fluid communication with the outlet of the cathode of the fuel cell stack and an inlet of the heat exchanger.

16. The fuel cell system according to claim 11, further comprising a motor coupled to the shaft of the compressor to urge the shaft of the compressor in a first direction and provide power to the compressor.

17. A method of operating a fuel cell system comprising the steps of:
   providing a fuel cell stack including a cathode having an inlet and an outlet, wherein a first fluid flows through the inlet of the cathode and a second fluid flows through the outlet of the cathode;
   providing a compressor for compressing the first fluid, an inlet of the compressor in fluid communication with a source of the first fluid and an outlet of the compressor in fluid communication with the inlet of the cathode;
   providing an expander coupled to the compressor, wherein the expander is in fluid communication with the outlet of the cathode;
   providing a freewheel mechanism for transferring the torque from the expander to the compressor, wherein the freewheel mechanism militates against the expander acting as a restrictor to the compressor; and
   causing the second fluid to flow through the expander to recover mechanical energy therefrom and generate torque to power to the compressor.

18. The method according to claim 17, further comprising the steps of:
   providing a heat exchanger disposed between and in fluid communication with the outlet of the compressor and the inlet of the cathode of the fuel cell stack;
   providing a humidifier disposed between and in fluid communication with an outlet of the heat exchanger and the inlet of the cathode of the fuel cell stack; and
   providing a motor coupled to the compressor to provide power thereto.

19. The method according to claim 17, wherein the first fluid is an oxidant.

20. The method according to claim 17, wherein the second fluid is a cathode exhaust fluid.

* * * * *